United States Patent
Christiansen et al.

(10) Patent No.: US 10,351,711 B2
(45) Date of Patent: Jul. 16, 2019

(54) ENGINEERED COMPOSITE STRUCTURE USING GRAPHENE OXIDE

(71) Applicant: Garmor Inc., Orlando, FL (US)

(72) Inventors: Sean Christiansen, Orlando, FL (US); David Restrepo, Orlando, FL (US); Dan O'Donnell, Orlando, FL (US); Matthew McInnis, Orlando, FL (US); Richard Stoltz, Plano, TX (US); Jeff Bullington, Orlando, FL (US)

( * ) Notice: Subject to any disclaimer, the term of this patent is extended or adjusted under 35 U.S.C. 154(b) by 0 days.

(21) Appl. No.: 15/559,741

(22) PCT Filed: Mar. 18, 2016

(86) PCT No.: PCT/US2016/023273
§ 371 (c)(1),
(2) Date: Sep. 19, 2017

(87) PCT Pub. No.: WO2016/154057
PCT Pub. Date: Sep. 29, 2016

(65) Prior Publication Data
US 2018/0044532 A1   Feb. 15, 2018

Related U.S. Application Data

(60) Provisional application No. 62/136,658, filed on Mar. 23, 2015.

(51) Int. Cl.
| | | |
|---|---|---|
| C09C 1/44 | (2006.01) | |
| C04B 28/04 | (2006.01) | |
| C08K 3/04 | (2006.01) | |
| C01B 32/23 | (2017.01) | |
| C01B 32/194 | (2017.01) | |
| C01B 32/198 | (2017.01) | |
| C04B 14/02 | (2006.01) | |
| C09C 1/00 | (2006.01) | |

(52) U.S. Cl.
CPC .............. *C09C 1/44* (2013.01); *C01B 32/194* (2017.08); *C01B 32/198* (2017.08); *C01B 32/23* (2017.08); *C04B 14/022* (2013.01); *C04B 28/04* (2013.01); *C08K 3/042* (2017.05); *C09C 1/0009* (2013.01); *C01B 2204/04* (2013.01); *C01B 2204/32* (2013.01)

(58) Field of Classification Search
CPC ......... B82Y 30/00; B82Y 40/00; C01B 32/19; H01G 11/36; H01G 11/38; H01G 9/058
See application file for complete search history.

(56) References Cited

U.S. PATENT DOCUMENTS

| | | |
|---|---|---|
| 2,459,520 A | 1/1949 | Greenshields |
| 5,057,370 A | 10/1991 | Krieg et al. |
| 5,360,582 A | 11/1994 | Boyd et al. |
| 5,501,934 A | 3/1996 | Sukata et al. |
| 5,506,061 A | 4/1996 | Kindl et al. |
| 5,583,176 A | 12/1996 | H aberle |
| 6,004,712 A | 12/1999 | Barbetta et al. |
| 6,348,279 B1 | 2/2002 | Saito et al. |
| 6,436,567 B1 | 8/2002 | Saito et al. |
| 7,329,698 B2 | 2/2008 | Noguchi et al. |
| 7,623,340 B1 * | 11/2009 | Song .................. B82Y 30/00 361/502 |
| 8,168,964 B2 | 5/2012 | Hiura et al. |
| 8,216,541 B2 | 7/2012 | Jang et al. |
| 8,580,132 B2 | 11/2013 | Lin et al. |
| 9,758,379 B2 | 9/2017 | Blair |
| 9,802,206 B2 | 10/2017 | Kitaura et al. |
| 2002/0008031 A1 | 1/2002 | Barsukov et al. |
| 2002/0119358 A1 | 8/2002 | Rock |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0241496 A1 | 10/2009 | Pintault et al. |
| 2010/0006445 A1 | 1/2010 | Tomatschger |
| 2010/0055025 A1 * | 3/2010 | Jang ................... B82Y 30/00 423/448 |
| 2010/0055458 A1 * | 3/2010 | Jang ................... B82Y 30/00 428/402 |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |

(Continued)

FOREIGN PATENT DOCUMENTS

| | | |
|---|---|---|
| CN | 102021633 A | 4/2011 |
| CN | 102719719 A | 7/2012 |

(Continued)

OTHER PUBLICATIONS

Steurer et al. Functionalized Graphenes and ThermoplasticNanocomposites Based upon ExpandedGraphite Oxide. Macromol. Rapid Commun. 2009, 30, 316-327.*

(Continued)

*Primary Examiner* — Noah S Wiese
(74) *Attorney, Agent, or Firm* — Edwin S. Flores; Chalker Flores, LLP

(57) ABSTRACT

This is generally a method of producing dispersed high quality engineered composite structures using flat flakes of graphene/graphene oxides/reduced graphene oxides in a host as the reinforcing additive of the composite.

20 Claims, No Drawings

(56) References Cited

U.S. PATENT DOCUMENTS

| | | |
|---|---|---|
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0143018 A1 | 6/2011 | Peng et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0077017 A1 | 3/2012 | Buresch |
| 2012/0107562 A1 | 3/2012 | Bolotin et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0272950 A1 | 10/2013 | Yun et al. |
| 2014/0018480 A1* | 1/2014 | Lee ................ C08K 5/20 524/235 |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0367436 A1 | 12/2015 | Chiu et al. |
| 2016/0016803 A1 | 1/2016 | Stoltz et al. |
| 2017/0233290 A1 | 8/2017 | Christiansen et al. |

FOREIGN PATENT DOCUMENTS

| | | |
|---|---|---|
| CN | 103058541 A | 4/2013 |
| CN | 103130436 A | 6/2013 |
| CN | 103215693 A | 7/2013 |
| CN | 103408880 A | 11/2013 |
| CN | 103757823 A | 4/2014 |
| CN | 103819915 A | 5/2014 |
| CN | 103962102 A | 8/2014 |
| CN | 104319372 A | 1/2015 |
| CN | 104446176 A | 3/2015 |
| CN | 104844930 A | 4/2015 |
| JP | 64-009808 A | 1/1989 |
| JP | 2012136567 A | 7/2012 |
| KR | 20110119429 A | 11/2011 |
| KR | 20130048741 A | 4/2013 |
| KR | 20130090979 A | 8/2013 |
| KR | 1020150026092 | 3/2015 |
| RU | 2456361 C1 | 7/2012 |
| WO | 2009032069 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011078639 A2 | 6/2011 |
| WO | 2011086391 A1 | 7/2011 |
| WO | 2011087301 | 7/2011 |
| WO | 2011162727 A1 | 12/2011 |
| WO | 2012058553 A2 | 5/2012 |
| WO | 2012148880 A2 | 11/2012 |
| WO | 2012177864 A1 | 12/2012 |
| WO | 2013001266 A1 | 1/2013 |
| WO | 2013096990 A1 | 7/2013 |
| WO | 2014062226 A1 | 4/2014 |
| WO | 2014080144 A1 | 5/2014 |
| WO | 2014104446 A1 | 7/2014 |
| WO | 2014210584 A1 | 12/2014 |
| WO | 2015065893 A1 | 5/2015 |
| WO | 2016040612 A1 | 3/2016 |
| WO | 2016123080 A1 | 8/2016 |
| WO | 2016200469 A1 | 12/2016 |
| WO | 2017053204 A1 | 3/2017 |

OTHER PUBLICATIONS

Extended European Search Report and Opinion for EPO 17185605.7 dated Nov. 29, 2017, 7 pp.

International Search Report and Written Opinion for PCT/US2017/058512 from KIPO dated Feb. 7, 2018, 14 pp.

Academic Press Dictionary of Science and Technology ("Flake", p. 1, obtained online Aug. 19, 2016).

Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.

Ebinezar, et al., "Analysis of hardness test for aluminum carbon nanotube metal matrix and graphene," Indian Journal of Engineering, vol. 10, No. 21, 2014, pp. 33-39.

Extended European Search Report and Opinion for EPO 12844344.7 dated Oct. 22, 2015, 8 pp.

Extended European Search Report and Opinion for EPO 14759787.6 dated Oct. 6, 2016, 13 pp.

Extended European Search Report and Opinion for EPO 14760912.7 dated May 11, 2016, 8 pp.

Fang, M., et al., ""Covalent polymer functionalization of graphenenanosheets and mechanical properties of composites"" Journal of Materials Chemistry, 2009, vol. 19, No. 38, pp. 7098-7105.

Feng, H., et al., "A low-temperature method to produce highly reduced graphene oxide," Nature Communications, Feb. 26, 2013, 8 pp.

FMC, Persulfates Technical Information, (http://ww.peroxychem.com/media/90826/aod_brochure_persulfate.pdf, downloaded on Jan. 19, 2017) 16 pp.

Herman, A., et al., "Bipolar plates for PEM fuel cells: a review." International Journal of Hydrogen Energy, 2005, vol. 30, No. 12, pp. 1297-1302.

Hwang, T., et al., "One-step metal electroplating and patterning on a plastic substrate using an electrically-conductive layer of few-layer graphene," Carbon, Sep. 17, 2011, vol. 50, No. 2, pp. 612-621.

International Search Report and Written Opinion for PCT/US2012/061457 from KIPO dated Mar. 15, 2013, 10 pp.

International Search Report and Written Opinion for PCT/US2014/021765 from KIPO dated Jul. 24, 2014, 11 pp.

International Search Report and Written Opinion for PCT/US2014/021810 from KIPO dated Jul. 14, 2014, 10 pp.

International Search Report and Written Opinion for PCT/US2014/062371 from KIPO dated Feb. 11, 2015, 12 pp.

International Search Report and Written Opinion for PCT/US2015/045657 from KIPO dated Oct. 27, 2015, 6 pp.

International Search Report and Written Opinion for PCT/US2015/049398 from KIPO dated Dec. 16, 2015, 13 pp.

International Search Report and Written Opinion for PCT/US2016/014873 from KIPO dated May 13, 2016, 15 pp.

International Search Report and Written Opinion for PCT/US2016/022229 from KIPO dated Jun. 27, 2016, 15 pp.

International Search Report and Written Opinion for PCT/US2016/023273 from KIPO dated Jul. 12, 2016.

International Search Report and Written Opinion for PCT/US2016/023435 from KIPO dated May 30, 2016, 13 pp.

International Search Report and Written Opinion for PCT/US2016/025307 from KIPO dated Sep. 12, 2016, 11 pp.

International Search Report and Written Opinion for PCT/US2016/025338 from KIPO dated Jul. 25, 2016, 12 pp.

International Search Report and Written Opinion for PCT/US2016/052292 from KIPO dated Nov. 21, 2016, 14 pp.

(56) References Cited

OTHER PUBLICATIONS

International Search Report and Written Opinion for PCT/US2017/027231 from KIPO dated Jul. 11, 2017, 18 pp.

Jeon, I., et al., ""Edge-carboxylated graphene nanosheets via ball milling."" Proceedings of the National Academy of Sciences of the United States of AmericaPNAS, Apr. 10, 2012, vol. 109, No. 15, pp. 5588-5593.

Liu, Y. B., et al., "Recent development in the fabrication of metal matrix-particulate composites using powder metallurgy techniques," Journal of Materials Science, vol. 29, No. 8, 1994, pp. 1999-2007.

McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".

Merriam-Webster ("Definition of Flake" p. 1-9, obtained online Aug. 19, 2016).

Mohajerani, E., et al., "Morphological and thickness analysis for PMMA spin coated films," Journal of Optoelectronics and Advanced Materials, vol. 9:12, Dec. 2007, p. 3901-3906.

Moustafa, S.F., et al., "Copper matrix SiC and Al2O3 particulate composites by powder metallurgy technique," Materials Letters, 2002, vol. 53, No. 4, pp. 244-249.

Ong, T. S., et al, "Effect of atmosphere on the mechanical milling of natural graphite," Carbon, 2000, vol. 38, No. 15, pp. 2077-2285.

Rafiee, M. et al., "Fracture and fatigue in graphene nanocomposites." Small, 2010, vol. 6, No. 2, pp. 179-183.

Steurer, P., et al., ""Functionalized graphenes and thermoplasticnanocomposites based upon expanded graphite oxide."" Macromolecular Rapid Communications, 2009, vol. 30, Nos. 4-5, pp. 316-327.

Szabo, T., et al., "Evolution of Surface Functional Groups in a Series of Progressively Oxidized Graphite Oxides," Chem. Mater., vol. 18, Mar. 29, 2006, pp. 2740-2749.

Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.

USP Technologies, "What is the pH of H2O2 solutions?," http://www.h2o2.com/faqs/FaqDetail.aspx?fId=26, accessed Jan. 19, 2017, 2 pp.

Wang, X. et al., ""In situ polymerization of graphene nanosheets andpolyurethane with enhanced mechanical and termal properties."" Journal of materials Chemistry, 2011, vol. 21, No. 12, pp. 4222-4227.

Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.

Wu, Z-S. et al., "Field Emission of Single-Layer Films Prepared by Electrophoretic Deposition." Advanced Materials, 21, 2009, pp. 1756-1760.

Zhao, W., et al., "Preparation of graphene by exfoliation of graphite using wet ball milling." Journal of Materials Chemistry, Jun. 3, 2010, vol. 20, pp. 5817-5819.

Extended European Search Report for EP 16765526.5 dated Feb. 13, 2018, 7 pp.

Extended European Search Report for EP 16769452.0 dated Mar. 1, 2018, 9 pp.

Extended European Search Report for EP 16780450.9 dated Apr. 19, 2018, 17 pp.

Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.

Li, Y., et al., "Hybridizing wood cellulose and graphene oxide toward high-performance fibers," NPG Asia Materials, 7, Jan. 9, 2015, 14 pp.

Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.

Tissera, N., et al., "Hydrophobic cotton textile surfaces using an amphiphilic graphene oxide (GO) coating," Applied Surface Science, 324, Nov. 4, 2014 (2015), pp. 455-463.

Yuanyuan, L., et al. "Hybridizing Wood Cellulose and Graphene Oxide toward High-Performance Fibers," NPG Asia Materials (2015) 7(e150), 14 pp.

\* cited by examiner

ENGINEERED COMPOSITE STRUCTURE USING GRAPHENE OXIDE

CROSS-REFERENCE TO RELATED APPLICATIONS

This application is the National Stage of International Application No. PCT/US2016/023273, filed on Mar. 18, 2016 claiming the priority to U.S. Provisional Application No. 62/136,658 filed on Mar. 23, 2015, the contents of each of which are incorporated by reference herein.

TECHNICAL FIELD OF THE INVENTION

The present invention relates in general to the field of graphite, and more particularly, to compositions and methods of graphite oxide entrainment in cement and asphalt composites.

BACKGROUND OF THE INVENTION

Without limiting the scope of the invention, its background is described in connection with composite materials.

Some classic engineered structures such as reinforced concrete may not be recognized as a composite. The fact is cement/concrete with rebar (short for reinforcing bar) qualifies as a composite. The rebar, having specific physical properties that significantly exceed those of the surrounding matrix, is placed into a pattern to optimize the strength of the composite.

Other composite engineered structures such as fiber-reinforced plastics are generally recognized as composites.

Such structures are often engineered to create the best combination of lowest weight and increased strength.

SUMMARY OF THE INVENTION

This invention relates to a novel method of making an engineered composite structure using flakes of at least one of graphene, graphene oxide, and reduced graphene oxide. These materials have the potential to be used as patterned/engineered composites in a large number of host materials (e.g. concrete or plastic) because graphene is one of the strongest materials ever tested.

In one embodiment, the present invention includes a method of making one or more composite structures using flakes of graphene, graphene oxide and/or reduced graphene oxide; comprising: obtaining substantially flat graphene, graphene oxide and/or reduced graphene oxide flakes with a surface area to thickness ratio of about 200 Angstroms; functionalizing the substantially flat graphene, graphene oxide and/or reduced graphene oxide flakes to be compatible a chemistry of a host material; and entraining the substantially flat graphene, graphene oxide and/or reduced graphene oxide flakes in the host material. In one aspect, wherein the step of functionalizing the substantially flat graphene, graphene oxide and/or reduced graphene oxide flakes is thermally or chemically. In another aspect, the substantially flat graphene, graphene oxide and/or reduced graphene oxide flakes have surface area to thickness ratios of about 200 Angstroms. In another aspect, 95% of the substantially flat graphene, graphene oxide and/or reduced graphene oxide flakes have surface area to thickness ratios of more than 200 Angstroms. In another aspect, a thickness of the substantially flat graphene, graphene oxide and/or reduced graphene oxide flakes is 16 nanometers or less. In another aspect, 95% of a thicknesses of the substantially flat graphene, graphene oxide and/or reduced graphene oxide flakes is about 0.8 to 16 nanometers, and the substantially flat graphene, graphene oxide and/or reduced graphene oxide flakes have a surface area to thickness ratios greater than 48400 to 1 Angstroms. In another aspect, the maximum dimension of the substantially flat graphene, graphene oxide and/or reduced graphene oxide flakes varies between 220 Angstroms and 100 microns. In another aspect, the substantially flat graphene, graphene oxide and/or reduced graphene oxide flakes have uniform distribution, dispersion and/or entrainment of graphene/graphite oxide flake with an additional powder or multiple powders, mixing prior to reacting, casting or otherwise combining to induce order or bonding to occur between the powders. In another aspect, the substantially flat graphene, graphene oxide and/or reduced graphene oxide flakes by weight are greater than 0.001% and less than 30% of oxidation of the graphene/graphite oxide in the powder mixed process. In another aspect, the one or more composite structures are created by forming localized regions of a higher concentration of G/GO/rGO in the host material, not to exceed 10% loading by weight. In another aspect, the host material is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly (ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). In another aspect, the step of functionalizing is defined further as adding a chemical group selected from at least one of alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or bonoric.

In another embodiment, the present invention includes a method of making a composite structure using flakes of graphene, graphene oxide and/or reduced graphene oxide; comprising: obtaining substantially flat graphene, graphene oxide and/or reduced graphene oxide flakes with a surface area to thickness ratio of about 200 Angstroms; functionalizing thermally or chemically the substantially flat graphene, graphene oxide and/or reduced graphene oxide flakes to be compatible a chemistry of a host material; entraining the substantially flat graphene, graphene oxide and/or reduced graphene oxide flakes in the host material; and forming a composite material with the flat graphene, graphene oxide and/or reduced graphene oxide flakes in the host material. In one aspect, the substantially flat graphene, graphene oxide and/or reduced graphene oxide flakes have surface area to thickness ratio of about 200 Angstroms. In another aspect, 95% of the substantially flat graphene, graphene oxide and/or reduced graphene oxide flakes have surface area to thickness ratios of more than 200 Angstroms. In another aspect, a thickness of the substantially flat graphene, graphene oxide and/or reduced graphene oxide flakes is 16 nanometers or less. In another aspect, 95% of a thicknesses of the substantially flat graphene, graphene oxide and/or reduced graphene oxide flakes is about 0.8 to 16 nanometers, and the substantially flat graphene, graphene oxide and/or reduced graphene oxide flakes have a surface area to thickness ratios greater than 48400 to 1 Angstroms. In another aspect, the maximum dimension of the substantially flat graphene, graphene oxide and/or reduced graphene oxide flakes varies between 220 Angstroms and 100 microns. In another aspect, the substantially flat graphene, graphene oxide and/or reduced graphene oxide flakes have uniform distribution, dispersion and/or entrainment in the host material prior to mixing and reacting, casting or otherwise combining to induce order or bonding to occur between the powders. In another aspect, the substantially flat graphene, graphene oxide and/or reduced graphene oxide flakes by weight are greater than 0.001% and less than 30% of oxidation of the graphene/graphite oxide in the powder mixed process. In another aspect, the composite material is created by creating localized regions of a higher concentration of GO/rGO in the host material, not to exceed 10% loading by weight. In another aspect, the host material is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). In another aspect, the step of functionalizing is defined further as adding a chemical groups selected from at least one of alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or bonoric.

DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "flat graphene, graphene oxide, and/or reduced graphene oxide flakes" (G/GO/rGO flakes) refers to any combination of one or more of the following: G, GO, and rGO, that is/are modified in accordance to the present invention. For example, when the G/GO/rGO is modified to match the chemistry of a host material, the present invention refers to a modification that will make it chemically compatible for distribution of the G/GO/rGO in the host, interaction with the host (dispersion or distribution), chemical binding to the host (covalent and non-covalent), it can be functionalized by, e.g., addition of a carboxylate group by thermal treatment or with chemical functionalization that is tailored to the hydrophobicity and/or create a functional group that is compatible with the chemistry of the host (e.g., polarity, hydrophobicity, etc.). Functionalizing the G/GO/rGO flake additive with a similar chemistry to the host allows the G/GO/rGO flake additive to be directly incorporated in the long or short range ordering or bonding. Non-limiting examples of functional groups that can be added to the G/GO/rGO flakes include, but are not limited to, alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or bonoric.

Non-limiting examples of a "host" or "host material", which terms are used interchangeably, for use with the present invention include, e.g., ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide).

Various research institutes have loaded hosts with carbon allotropes such as carbon nanotubes (CNT), graphene flakes (GF), graphene oxide (GO), and graphite oxide and have seen up to a 200% increase in tensile strength in the loaded host. Measurements have shown that graphene has a breaking strength 200 times greater than steel, with a tensile strength of 130 GPa. An Atomic Force Microscope (AFM) has been used to measure the mechanical properties of a suspended graphene sheet. A graphene sheet was suspended over a $SiO_2$ substrate with cavities and was probed with an AFM tip to test its mechanical properties. Its spring constant was in the range 1-5 N/m and the Young's modulus was 0.5-1 TPa, thereby demonstrating that graphene can be mechanically very strong and rigid. Despite these nanoscale mechanical properties, neither graphene, nor graphene oxide has transitioned to commercial use in a macro-scale mechanical structure due to price and dispersion related issues.

In the past, the process of producing a loaded host has not necessarily translated to a viable composite structure. The inability to translate the technology to a viable composite structure is a combination of technical issues, including uniform distribution/dispersion of the suspension in the host material, inadequate bonding of the reinforcing agent to the host material, and cost factors.

Traditionally, dispersion has been accomplished in a liquid host by a combination of sonication and stirring. In some cases the liquid or slurry of particles have been modified through functionalization of the particle or additive, or by modifying the host's viscosity, pH, or through the use of surfactants, as a means of improving dispersion and mechanical bonding. Interactions between the liquid host and particle, particle-to-particle interaction/attraction and the settling of the particles have significantly negatively impact the uniformity of the dispersion, which is deleterious to the strength of the resulting composite. In general, higher concentrations of GO or reduced GO (rGO) additive in a host can result in the stacking or aggregation of the additive, resulting in thicker GO or rGO structures which create point defects in the host. These thicker GO or rGO structures are stacked sheets held together by van der Waals forces that can slip relative to each other, thereby creating point defects in the host. Such point defects will result in the composite having a lower mechanical strength. Additive loadings greater than a few percent generally result in flocculation or loose agglomeration resulting in these point defects. Graphene oxide, when uniformly dispersed in the host or in an engineered/designed pattern, facilitates load transfer and mechanical support for greater structural strength. The technical approach of the present invention offers for the first time the ability to replace the use of metallic reinforcements that corrode and lose mechanical integrity with a much more chemically stable additive.

In general, using graphene/graphite oxide flake as mechanical enhancement additives requires optimization of the interfacial bonding between the graphene/graphite oxide flake and the matrix of the host. Optimizing the interfacial bonding requires two critical aspects. First, providing planar flake surfaces that are not distorted through the graphene/graphite oxide flake production process. Second, the modification of the chemistry of the flakes to allow full entrainment of the flakes into the host's matrix. For example, graphene/graphite oxide flake chemistry may be changed by modifying the flake edge carboxylate group by thermal treatment or with chemical functionalization that can tailor the hydrophobicity and/or create a functional group that is compatible with the host's chemistry (e.g., polarity, hydrophobicity, etc.). Functionalizing the graphene/graphite oxide additive with a similar chemistry to the host allows the graphene additive to be directly incorporated in the long or short range ordering or bonding. The host can include, for example, plastics, metals, cement, asphalt, ceramics, and glass materials.

The thickness to surface area ratio and planarity of the graphene/graphite oxide flake are important characteristics in achieving interfacial bond strength with the host. The thickness to surface-area ratio, in addition to the minimization of epoxy groups on the graphene/graphite oxide flake, can play a significant role in the graphene flake's ability to positively impact the properties of the host.

The combination of a large surface area with a modest thickness can be conceptually comparable to the ideal larger area monolayer needed by the semiconductor industry. A large, flat, highly-conductive graphene flake will conduct phonons and electrons better than the host alone. A graphene/graphite oxide flake bonded by van der Waal forces is more desirable than a thin flake surrounded for mechanical applications as well. Larger graphene surface area to thickness ratios better mitigate and distribute a mechanical load, giving the host enhanced mechanical properties, including but not limited to increased tensile, shear, and flexural strength. The ability to achieve substantial enhancement of the host's mechanical properties can be obtained with a flake with an area of 48400 $Å^2$ and a thickness of 160 to 200 Å. A 48400 $Å^2$ area flake with a thickness of 160 Å has a surface area to thickness ratio of about 200 Å and can provide enhancement to the host's mechanical properties. In one example of the present invention, 95% of the G/GO/rGO flakes used have a surface area to thickness ratio of a minimum of 200 Angstroms.

In some embodiments, the thicknesses of the G/GO/rGO flakes is generally 16 nanometers or less, as too many layers significantly reduce the tensile strength (preferably, 95% of the G/GO/rGO flakes are from about 0.8 to 16 nanometers thick, and our surface area to thickness ratio is greater than 48400 to 1 Angstroms). Preferably, the maximum dimension of the flake varies between 220 Angstroms and 100 microns in diameter. This requires precise process control or a process that allows separation of the graphene flakes by surface area and/or thickness.

Uniform distribution, dispersion and/or entrainment of graphene, graphite oxide, and/or reduced graphene oxide (G/GO/rGO) flakes within the host can be achieved through several methods, including: use of an additional powder or multiple powder additives, mixing prior to reacting, casting or otherwise causing the powders to become ordered by thermal, chemical, electrical or other processes that induce order or bonding between the powders, e.g. solidified or gelled. Having a singular functionalization or decoration of COOH with substantially no epoxy groups can allow the reaction between the powders to be optimized. Preferably, greater than 0.01% (w) and less than 30% of oxidation of the graphene/graphite oxide is used in the powder mixed process.

Engineered structures can be created by creating localized regions or structures of a higher concentration of G/GO/rGO in the host, not to exceed 10% loading by weight. The higher concentration regions of G/GO/rGO can act as additional load bearing and load dispersing structure, providing additional mechanical support and strength. The pattern can be created specifically for the structure and load to optimize the mechanical support. For example, when using additive manufacturing techniques, classical mechanical structures, including but not limited to angles, I-beams, ribs, and corrugations, can be engineered within the enhanced composite.

Obtaining consistent size and thickness of the substantially flat graphene, graphene oxide and/or reduced graphene oxide flakes (G/GO/rGO flakes) can require controlled preprocessing (e.g., milling, oxidation and separation) of the crystalline graphite precursor. A mechanochemical process can use crystalline graphite with a mild oxidizing agent in conjunction with mechanical energy (milling) for synthesis of graphene/graphite oxide/reduced graphene oxide flakes. Preferably, the surface area to thickness ratio should be greater than about 200 Å to have a positive impact in the host. A mechanochemical process can be controlled to process graphene/graphite with varying extents of oxidization from 0.1% to 30%. Unless otherwise indicated or produced by the Hummers' process, the term "graphene" as used herein means graphene/graphite with oxidization from 0.01% to 30%. The functionalization can be COOH on the edge carbons preserving the graphene structure with substantially no epoxy groups.

The graphene/graphite can be combined with the host powder or liquid in a mechanical agitation process.

The uniform dispersion with the G/GO/rGO flakes can be created and aligned using shearing and laminar forces for orientation and mixing in addition to other methods such as: melt blending, counter rotating screw, sonication or other mixing processes of the graphene/graphite additive. Other powders can be the cast, extruded or otherwise processed into the final product by inducing long or short range ordering or bonding through chemical, thermal, electrical, shearing, or mechanical treatments. The mixing to create uniform dispersement of graphene/graphite oxide flakes can be achieved in minutes to several hundred minutes in a ball mill or other mixing devices.

The engineered portion of the composite can be created by a stylist, ink jetted, printed, painted or silk-screen printed/deposited in a pattern of a higher concentration of the strength enhancing additive. The deposited G/GO/rGO material can be incorporated on the surface of a laminate where the laminate has layers where each layer has its own printed/deposited reinforcement pattern. The reinforcement pattern may be the same or different from layer to layer based on the desired engineering result. For a slurry or liquid composite, the engineered strength-enhancing additive may be injected below the surface, allowing the liquid or slurry to reflow back over the injected material. Alternatively, a portion of the slurry or liquid may be cast, and the strength-enhancing additive deposited/printed on the surface and the remainder of the slurry or liquid poured over the surface to encase the engineered strength-enhancing additive. This process can be repeated to produce a multilayer engineered reinforced composite where the reinforcement is inert to corrosion or other environmental effects.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making one or more composite structures using flakes of graphene, graphene oxide and/or reduced graphene oxide; comprising:
   obtaining substantially flat graphene, graphene oxide and/or reduced graphene oxide flakes that are not distorted through the graphene/graphite flake production process, with a surface area to thickness ratio of a minimum of 200 Angstroms;
   thermally functionalizing the substantially flat graphene, graphene oxide and/or reduced graphene oxide flakes to be compatible a with chemical binding, hydrophobicity, and/or polarity of a host material, to be directly incorporated in the long and short range ordering or bonding of the host material; and
   entraining the substantially flat graphene, graphene oxide and/or reduced graphene oxide flakes in the host material.

2. The method of claim 1, wherein 95% of the substantially flat graphene, graphene oxide and/or reduced graphene oxide flakes have surface area to thickness ratios of more than 200 Angstroms.

3. The method of claim 1, wherein a thickness of the substantially flat graphene, graphene oxide and/or reduced graphene oxide flakes is 16 nanometers or less.

4. The method of claim 1, wherein 95% of a thicknesses of the substantially flat graphene, graphene oxide and/or reduced graphene oxide flakes is about 0.8 to 16 nanometers, and the substantially flat graphene, graphene oxide and/or reduced graphene oxide flakes have a surface area to thickness ratios greater than 48400 to 1 Angstroms.

5. The method of claim 1, wherein the maximum dimension of the substantially flat graphene, graphene oxide and/or reduced graphene oxide flakes varies between 220 Angstroms and 100 microns.

6. The method of claim 1, further comprising mixing the substantially flat graphene, graphene oxide and/or reduced graphene oxide flakes with an additional powder or multiple powders to achieve uniform distribution, dispersion and/or entrainment of graphene/graphite oxide flake within the host material; and
   reacting, casting or otherwise causing the powders to become ordered, by thermal, chemical, electrical or other processes that induce order or bonding to occur between the powders.

7. The method of claim 6, wherein the substantially flat graphene, graphene oxide and/or reduced graphene oxide flakes by weight are greater than 0.001% and less than 30% of oxidation of the graphene/graphite oxide in the result of the step of mixing.

8. The method of claim 1, wherein the one or more composite structures are created by forming localized regions of a higher concentration of graphene, graphene oxide and/or reduced graphene oxide in the host material, not to exceed 10% loading by weight.

9. The method of claim 1, wherein the host material is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide).

10. The method of claim 1, wherein the step of functionalizing is defined further as adding a chemical group selected from at least one of alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or bonoric.

11. A method of making a composite structure using flakes of graphene, graphene oxide and/or reduced graphene oxide; comprising:

obtaining substantially flat graphene, graphene oxide and/or reduced graphene oxide flakes that are not distorted through the graphene/graphite flake production process, with a surface area to thickness ratio of a minimum of 200 Angstroms;

thermally functionalizing the substantially flat graphene, graphene oxide and/or reduced graphene oxide flakes to be compatible a with chemical binding, hydrophobicity, and/or polarity of a host material, to be directly incorporated in the long and short range ordering or bonding of the host material;

entraining the substantially flat graphene, graphene oxide and/or reduced graphene oxide flakes in the host material; and forming a composite material with the substantially flat graphene, graphene oxide and/or reduced graphene oxide flakes in the host material.

12. The method of claim 11, wherein 95% of the substantially flat graphene, graphene oxide and/or reduced graphene oxide flakes have surface area to thickness ratios of more than 200 Angstroms.

13. The method of claim 11, wherein a thickness of the substantially flat graphene, graphene oxide and/or reduced graphene oxide flakes is 16 nanometers or less.

14. The method of claim 11, wherein 95% of a thicknesses of the substantially flat graphene, graphene oxide and/or reduced graphene oxide flakes is about 0.8 to 16 nanometers, and the substantially flat graphene, graphene oxide and/or reduced graphene oxide flakes have a surface area to thickness ratios greater than 48400 to 1 Angstroms.

15. The method of claim 11, wherein the maximum dimension of the substantially flat graphene, graphene oxide and/or reduced graphene oxide flakes varies between 220 Angstroms and 100 microns.

16. The method of claim 11, further comprising mixing the substantially flat graphene, graphene oxide and/or reduced graphene oxide flakes with an additional powder or multiple powders to achieve uniform distribution, dispersion and/or entrainment of graphene/graphite oxide flake within the host material; and reacting, casting or otherwise causing the powders to become ordered, by thermal, chemical, electrical or other processes that induce order or bonding to occur between the powders.

17. The method of claim 16, wherein the substantially flat graphene, graphene oxide and/or reduced graphene oxide flakes by weight are greater than 0.001% and less than 30% of oxidation of the graphene/graphite oxide in the result of the step of mixing.

18. The method of claim 11, wherein the composite material comprises localized regions of a higher concentration of graphene oxide and/or reduced graphene oxide in the host material, not to exceed 10% loading by weight.

19. The method of claim 11, wherein the host material is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide).

20. The method of claim 11, wherein the step of functionalizing is defined further as adding a chemical groups selected from at least one of alkyl, alkenyl, alkynyl, phenyl, halo, hydroxyl, carbonyl, aldehyde, carbonate, carboxylate, carboxyl, ester, methoxy, hydroperoxy, ether, hemiacetal or hemiketal, acetal, ketal, orthoester, amide, amine, imine, imide, azide, azo, cyanate, nitrile, nitrite, nitro, nitroso, oxime, pyridine, thiol, sulfide, disulfide, sulfoxide, sulfone, sulfinic, thiocyanate, phosphine, phosphonic, phosphate, and/or boronic.

* * * * *